March 18, 1941.  J. P. J. MANGGAARD  2,235,404
EGG CLEANING MACHINE
Filed Aug. 7, 1939  2 Sheets-Sheet 1
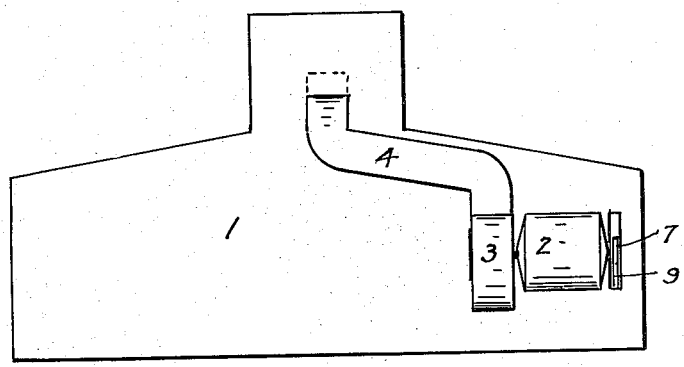
Fig. 1.
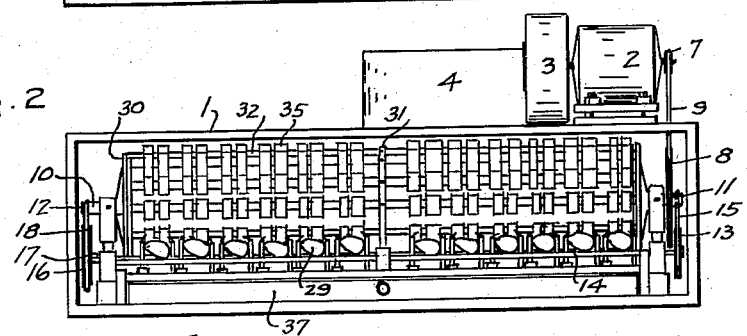
Fig. 2
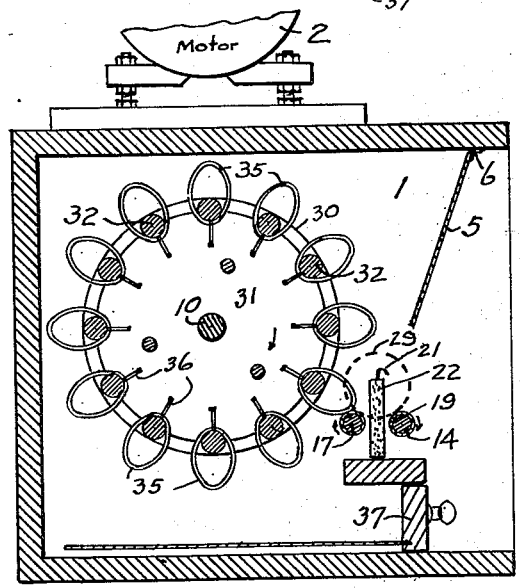
Fig. 4.
Fig. 3
Inventor
Jens P.J. Manggaard
By
Attorney

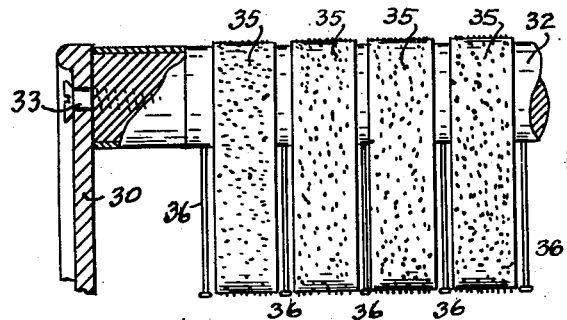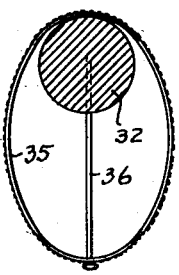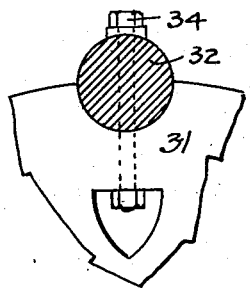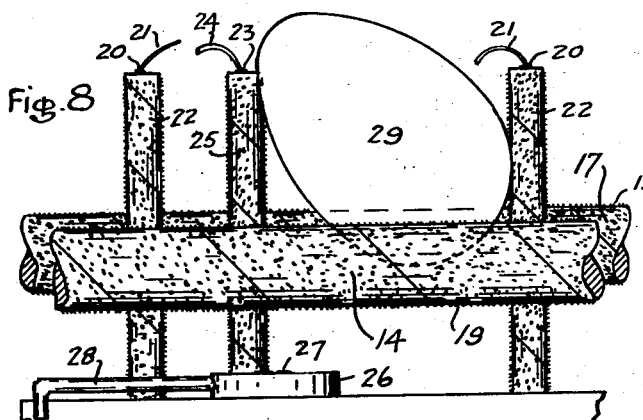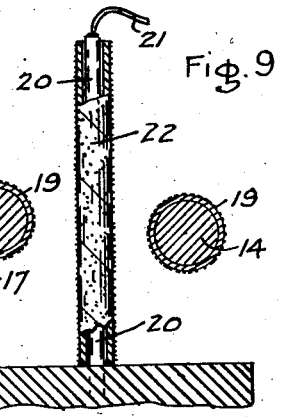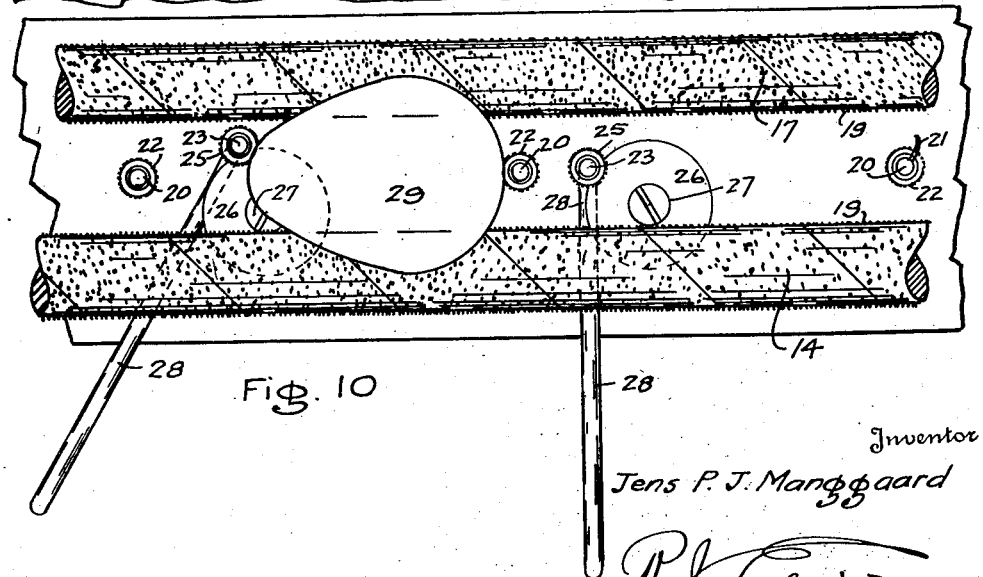

Patented Mar. 18, 1941

2,235,404

UNITED STATES PATENT OFFICE 2,235,404

EGG CLEANING MACHINE

Jens P. J. Manggaard, Tenino, Wash.

Application August 7, 1939, Serial No. 288,813

4 Claims. (Cl. 51—103)

This machine relates to mechanical means for cleaning eggs and especially to such machines as may be operated continuously and which do not make use of water, and has for its objects, first, to provide means which cause the individual eggs to turn and wabble as they are being cleaned; second, in which the egg-holding means is adjustable to accommodate eggs of various sizes; third, to provide means for carrying off the dust from the cleaned eggs; fourth, to provide for the collecting of the broken eggs and the heavier dust from the eggs; fifth, to provide a series of wiping means to engage the eggs at a plurality of points, whereby as the egg turns and wabbles every part of its surface is engaged by many abrasive bodies moving lightly and swiftly past the egg to remove all dirt therefrom; sixth, to provide a series of yielding abrasive wipers for engaging the eggs; seventh, to provide readily removable and renewable abrasive means for engaging the eggs; and in general to provide a machine which is simple in construction, easy to operate, and effective in use.

I attain these and other objects by the devices, mechanisms, and arrangements illustrated in the accompanying drawings, in which—

Fig. 1 is a general plan view of my improved egg-cleaning machine; Fig. 2 is a front elevation thereof, with the screen or shield removed; Fig. 3 is a diagrammatical illustration of the driving connections of the machine; Fig. 4 is a typical vertical cross-section of the machine; Fig. 5 is a front view of a portion of one of the squirrel-cage rods, with the abrasive wipers loosely hanging thereon; Fig. 6 is a cross-section thereof; Fig. 7 is a similar view showing the connection of one such rod with the central supporting disk; Fig. 8 is a front elevation of a portion of the egg-holding and turning means; Fig. 9 is a cross-section thereof; and Fig. 10 is a plan view thereof.

Similar numerals of reference refer to similar parts throughout the several views.

The machine is enclosed in a box or cabinet 1 which may be mounted on legs or placed on a suitable support or table, and which is open at the front and provided with a constricted opening at the rear through which the dust from the eggs may be expelled into a suitable receptacle (not shown). A motor 2 is mounted on the top of the cabinet 1 and is provided at one end with a suitable centrifugal fan 3 adapted to blow air into the passage 4 which leads therefrom into the said constricted exhaust passage, thereby creating a draft which is sucked into the front of the cabinet 1 and which carries the floating dust therefrom out through the constricted opening at the rear and thereby protects the worker from breathing the dust. The front of the cabinet 1 is preferably provided with a screen or shield 5 extending across its upper part and which, normally when the machine is in operation, lies approximately in the position shown in Fig. 4, but which may be swung on its hinges 6 to permit adjustment or renewal of the mechanisms within the cabinet. This screen 5 forces the draft to pass adjacent to the eggs and aids in protecting the worker.

The motor 2 also drives the egg wabbling and egg wiping parts of the machine. Referring to Fig. 3 it will be seen that the motor 2 is provided with a small pulley 7 on its shaft and that this pulley 7 is connected to a large pulley 8 by means of a belt 9. The large pulley 8 is mounted on the cross shaft 10, on which the hereinafter described squirrel-cage wiper is mounted. This shaft 10 is provided with two small pulleys 11 and 12 at its ends. The pulley 11 is connected to the larger pulley 13 on the front egg-roller shaft 14 by the belt 15 and the pulley 12 is connected to the larger pulley 16 on the rear egg-roller shaft 17, by the belt 18. The shafts 10, 14 and 17 are parallel and extend substantially the full width of the machine. The front shaft 14 is mounted at a slightly lower level than the rear shaft 17 (Fig. 9). The relations between the pulleys 11—13 and 12—16 are different, thus causing the shafts 14 and 17 to turn at different rates though in the same direction or sense.

Referring to Figs. 8, 9 and 10 it will be seen that each of the shafts 14 and 17 is wound with a strip of sand paper forming an abrasive shell 19. This shell is readily removable as it wears out and may be easily renewed with a fresh strip whenever desired. The two shafts 14 and 17 are separated by a sufficient distance to easily and effectively hold and support a series of eggs on them. Their length is divided into egg compartments by a series of fixed posts each of which is positioned centrally between the shafts 14 and 17 and each of which consists of a stiff wire 20, ending in a thin flexible wire 21. The wire 20 is surrounded by a loose shell or tube 22 of sand paper, which freely turns on the wire 20 and which is held thereon by the bent flexible wire 21. The tube 22 may, therefore, be removed when worn by simply straightening the bent wire 21, and when a new tube is placed thereon the said wire 21 may be again bent over to hold the tube from climbing off the wire 20 as it is rotated by the turning of the egg. A second set of vertical posts are provided, said second set being alternated with said fixed posts and being adjustably mounted so as to adjust the longitudinal distance between the fixed and the adjustable posts to accommodate eggs of different sizes. These posts are of similar construction to the fixed posts, above described, comprising a vertical stiff wire 23, a flexible wire 24 and a loose cover or tube 25. The adjustment is attained by eccentrically mounting the stiff wire 23 on the edge of a disk 26, which is secured in place by a central screw 27 and which is turnable thereon. I prefer to bend the wire 23 at the disk 26 and to carry it forward, under the shaft 14, to form an adjusting handle 28.

The eggs 29 are, therefore, supported on the two shafts 14 and 17 and between the tubes 22 and 25 on the limiting posts. It is convenient to provide twelve such fixed and adjustable posts to care for a dozen eggs at a time. The eggs are turned axially by the shafts 14 and 17 and, as they turn, their respective axes are given an indefinite wabbly motion.

The wiping of the eggs 29 is attained by the following mechanism: The cross-shaft 10 is provided with two end disks 30 and a central disk 31, mounted and secured thereon. As seen in Fig. 4, a series of twelve wooden rods 32 extend between the disks 30, being secured thereto by suitable screws 33 (Fig. 5). As the rods 32 pass the central disk 31, which is of smaller diameter than the disks 30, they lie in suitable peripheral grooves and are secured in place by the bolts 34 (Fig. 7). Each rod 32 is provided with a plurality of narrow sand paper loops 35 which hang loosely on the said rods 32 when the machine is not in operation (Fig. 6) but which fly outward therefrom radially, under the action of centrifugal force, when the shaft 10 with the disks 30 and 31 are rotated (Fig. 4). It is evident that the shaft 10, the disks 30 and 31, and the rods 32 form a structure usually known as a squirrel-cage. The loops 35 are of such a size as to extend from the rods a sufficient distance so as to engage the surface of the egg 29 as they are driven therepast, thus wiping the egg with a gentle, yielding, yet abrasive action. The loops 35 are held from longitudinal motion along the rods by means of separating pins 36, extending inward from the rods 32 (Figs. 4, 5 and 6). I prefer to provide at least four such loops for each egg space between the posts 22 and 25. The rate of motion of the wiper loops 35 is such that each loop will stroke the egg about forty times for each revolution of the egg and since there are twelve loops in line on the twelve rods 32, it follows that every portion of the egg is engaged by the wipers many times. The fact that the two shafts 14 and 17 turn at different speeds and are covered with an abrasive surface causes the said shafts to have a cleaning effect on the eggs resting thereon. The rapidly repeated wiping action of the successive loops 35, as they come in contact with the constantly turning and wabbling egg causes every portion of the egg to be quickly cleaned thereby. As a matter of experience I find that by the time the attendant has put the last egg in place the first egg is ready for removal, so that he is constantly taking an egg out of the cleaner and replacing it with a new egg, one after the other, thus making a substantially continuous process.

I provide a drawer 37, which is mounted just under the shafts 14 and 17, to receive the coarser dust from the eggs and also any broken eggs which might get in the machine.

It is, of course, understood that many variations may be made in the details of construction of my machine without departing from the spirit of my invention as outlined in the appended claims, and that the words and terms used in the specification and claims have been selected for convenience and are to be given the most generic meaning permitted by the invention and the art at the present time.

Having, therefore, described my invention, what I claim and desire to secure by Letters Patent, is:

1. In an egg cleaning machine, the combination of two parallel rotating shafts adapted to support and turn an egg; of a fixed vertical post positioned between said shafts and adapted to hold an egg from axial motion therealong in one direction; a second vertical post positioned between said shafts and adapted to hold the egg in inclined position from axial motion in the other direction; means adapted to adjust the position of the second post to provide for eggs of various sizes between said posts, said adjusting means comprising a rotary eccentric mounting for said second post, with a handle extending therefrom, whereby the mounting may be turned to adjust the position of the post; a rotating squirrel cage adjacent to and parallel to said shafts; and loose abrasive wiping loops mounted on the rods of said squirrel cage and adapted to engage and wipe said egg as it is turned.

2. An egg cleaning machine as set forth in claim 1, together with loose tubular abrasive covers for both said posts.

3. An egg cleaning machine as set forth in claim 1, together with a flexible wire mounted on the end of each of said posts and with loose tubular abrasive covers for each of said posts, said covers being held on said posts by said flexible wires bent over the upper ends of said covers.

4. In an egg cleaning machine, the combination of two parallel rotating shafts adapted to support and turn an egg, said shafts being covered with an abrasive paper, and one of said shafts rotating faster than the other; a rotating squirrel cage; and loose abrasive wiping loops mounted on the rods of said squirrel cage, said loops acting under centrifugal force to successively engage and abrasively wipe with a downward stroke said egg as it is turned by said shafts.

JENS P. J. MANGGAARD.